Patented Feb. 22, 1949

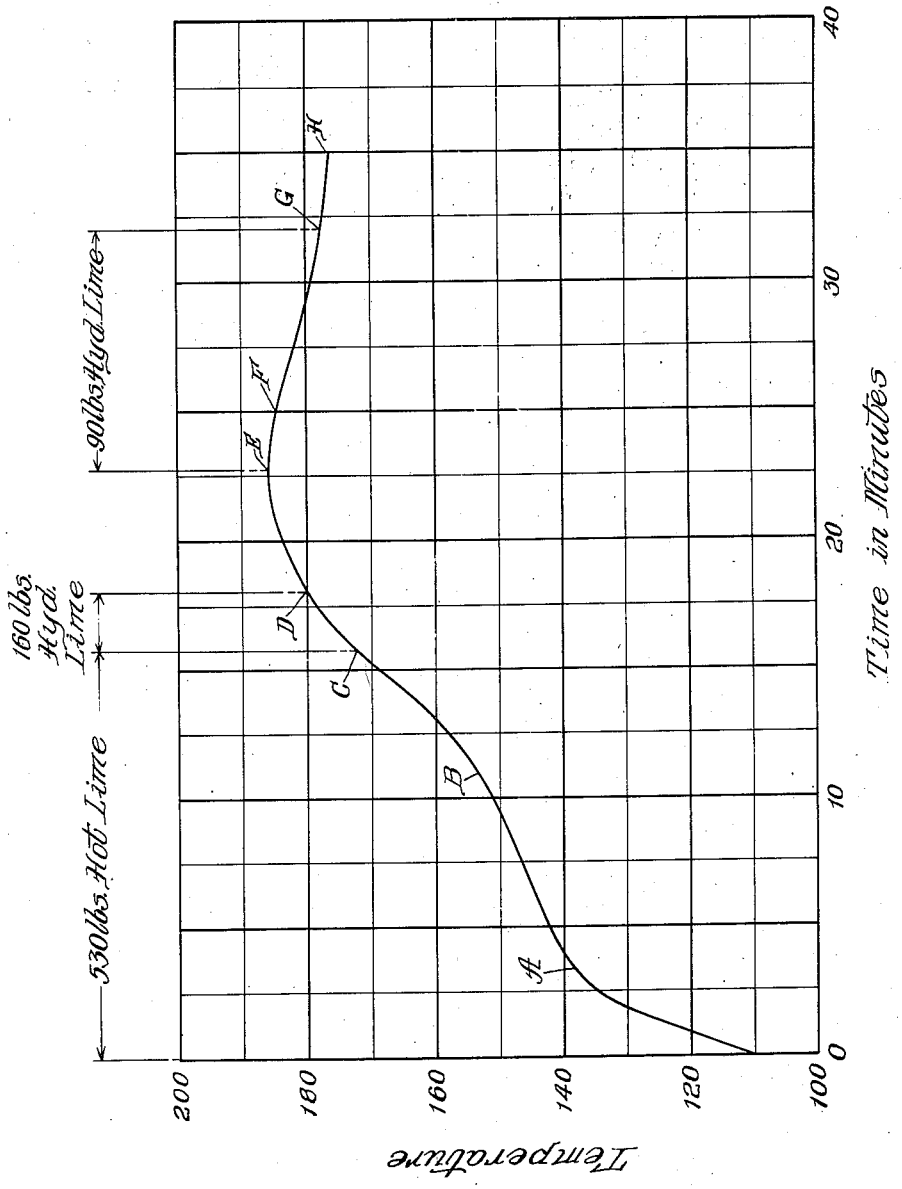

2,462,104

UNITED STATES PATENT OFFICE 2,462,104

MANUFACTURE OF CRYSTALLINE ANHYDROUS MONOCALCIUM PHOSPHATE

William Hugh Knox, Jr., Robert Taylor Cochran, and William Remfry Crudup, Nashville, Tenn., and Warren Standish Miller, Lake Charles, La., assignors to Victor Chemical Works, a corporation of Illinois Application September 15, 1943, Serial No. 502,474

6 Claims. (Cl. 23—109)

This invention relates to an improved process for the manufacture of crystalline anhydrous monocalcium phosphate and the products resulting therefrom.

In Patent 2,160,700, issued May 30, 1939, there is described a process for the manufacture of crystalline anhydrous monocalcium phosphate having peculiar properties as a baking acid and primarily adapted for heat treatment for further improvement of these properties by the formation of a thin, autogenous, glassy, substantially complete, relatively insoluble coating thereon.

In the process therein described, phosphoric acid having a Bé. gravity strength of over 54° was heated and mixed with lime to cause a rapid increase in temperature of the reaction mass to above 140° C. but below 170° C. In the preferred process, the temperature was maintained between 160° C. and 170° C. by small alternate additions of lime and water.

The products produced by the process therein described had a secondary reaction with sodium bicarbonate, after heat treatment, of as much as 50% or even slightly more, and, at the end of 20 days' storage in a humidor at 39° C. and a relative humidity of 65%, the secondary reaction was still at least 35% but not much more than that. The reaction terms "primary" and "secondary" are used in the present specification in the same sense as such terms were employed in United States Patent 2,160,700. Briefly, the primary reaction is expressed in terms of the amount of $CO_2$ evolved at 27° C. within the first 2 minutes, from a standard baking powder mixture containing sufficient sodium bicarbonate theoretically to liberate 200 cc. of $CO_2$; whereas, the secondary reaction is expressed as the number of cc. of $CO_2$, or the percentage of the total, liberated from the same mixture in the ensuing 8 minutes.

It has now been discovered that a product having improved properties of keeping in storage, may be produced by altering the process of manufacture of the coated crystalline anhydrous monocalcium phosphate. By means of the new process, products having, after heat treatment, a secondary reaction of 55% and upwards may be produced which, after 20 days' storage in an atmosphere of 65% relative humidity at 39° C., still have a secondary reaction of over 50%. In fact, products of such stability at higher relative humidities have been produced. As an illustration, the following tabulation shows comparative reactions with sodium bicarbonate of the new product and a product made under United States Patent 2,160,232 after 20 days' exposure at 67% relative humidity at 39° C.

|  | Old Product | New Product |
|---|---|---|
| 1 minute............cubic centimeter.. | 40 | 21 |
| 2 minutes........................do.... | 70 | 35 |
| 3 minutes........................do.... | 92 | 55 |
| 4 minutes........................do.... | 110 | 85 |
| 5 minutes........................do.... | 121 | 109 |
| 6 minutes........................do.... | 129 | 127 |
| 7 minutes........................do.... | 135 | 137 |
| 8 minutes........................do.... | 138 | 142 |
| 9 minutes........................do.... | 139 | 145 |
| 10 minutes.......................do.... | 140 | 147 |
| Primary reaction............percent.. | 35.0 | 17.5 |
| Secondary reaction............do.... | 35.0 | 56.0 |

In making these comparisons of the heat-treated products it is of course essential to compare products having the same chemical composition, inasmuch as products having properly adjusted coating-forming ingredients will have better secondary reactions than those in which the ingredients are not properly selected. The present process requires that the ingredients, or impurities, as they are called, be properly selected, inasmuch as the temperatures employed in it are considerably higher than heretofore used, and improper selection of impurities or improper handling of operating conditions may result in a poor product.

It has now been discovered that the coating-forming impurities fall into two classes which have been designated primary and secondary. The primary impurities are those which tend to retard the rate of evolution of $CO_2$ from a baking powder mixture, possibly acting as fluxing agents in formation of a protective glassy coating over the particles of anhydrous monocalcium phosphate. The secondary impurities appear to complement the primary impurities by modifying the coating so as to increase its resistance towards deterioration when exposed to a humid atmosphere. These secondary impurities which are considered stabilizing impurities, have little or no value in affecting the secondary reaction at the time of manufacture of the product, but do have a controlling effect in combination with primary impurities on the ability of the product to withstand the deteriorating effect of atmospheric moisture. For example, of two products, each containing proper primary impurities, one only containing the proper secondary impurity, each having a secondary reaction of 60% when made, are stored in a humidor for 20 days, the one with proper primary and secondary impurities may still have a secondary reaction of over 50% at the end of that time, whereas the secondary reaction of the other product may be quite low.

The desirable primary or fluxing impurities are potassium, sodium, ammonium, zinc and lithium.

The desirable secondary or stabilizing impurities are aluminum, tin, cadmium, iron and boron.

The exact functioning of the impurities is not yet thoroughly understood. It is well recognized that the heat treated crystal of anhydrous monocalcium phosphate is surrounded by a relatively water-impenetrable, glassy coating. The coating of course must not be completely impenetrable, otherwise the material would be totally unfit for use as a baking acid. The degree of initial impenetrability appears to depend on the completeness of the coating and this, in turn, appears to depend on the fusibility and nature of the compounds produced on the surface of the particles by the primary impurities, and on the conditions of temperature and humidity under which the coating is produced.

The function of the secondary impurities is more obscure. It appears that these impurities combine with the compounds produced by the primary impurities to form more complex compounds of less hygroscopic nature, thereby rendering the coating less susceptible to the effect of moisture vapor. It has been found, however, that there is a critical relative humidity relationship for each type of coated product. For example, many products will withstand storage for long periods at 39° C. and 65% relative humidity, but at 70% relative humidity the products may deteriorate very rapidly.

In giving the reaction data, the products discussed are those produced upon heat treatment, unless it is specifically stated otherwise.

In reacting the product with sodium bicarbonate in aqueous solution the reaction is delayed only for a few minutes while the aqueous solution penetrates the coating, after which time the reaction proceeds in a normal manner.

In deteriorating in a moist atmosphere, all of the compounds appear to hydrate slowly for some time, after which hydration occurs much more rapidly. Furthermore, the secondary reaction shows the same type of change. This may be due to fracture of the glassy coating after a certain amount of hydration has occurred in the inner crystal.

It is of course strange that the coated crystals should resist at all the passage of water in vapor phase when the passage of liquid water is only retarded for a few minutes. The natural expectation would be that the vapor would penetrate at will if the liquid could penetrate at all. Furthermore, since there must be openings in the coating to permit liquid water to penetrate, it has been difficult to explain the existence of a critical water vapor pressure limit for the coated compounds. It is believed possible, however, that the primary impurities in the coating, which are potassium, sodium, ammonium, zinc and lithium, are largely in the form of insoluble complexes in which calcium plays a considerable role. It is possible that these complexes tend to hydrolyze or otherwise break down and liberate minute quantities of the normally highly soluble alkali metal and zinc salts. These materials would probably be hygroscopic, and, if moisture conditions were such as to cause these compounds to be formed, or, if formed, to pick up water in liquid form, there would be a tendency to pass water in liquid form as a film over the crystal in the well known manner.

If this is the correct explanation of the action of the crystal, then the secondary or stabilizing impurities may be considered to enter into the complex formation in such a manner as to prevent dissociation thereof into small quantities of soluble materials.

The foregoing theoretical discussion is important in considering the process of manufacture of the coated anhydrous monocalcium phosphate because the method of formation of this anhydrous material affects the ability of the product to be heat treated. Extensive investigation indicates that the present method of manufacturing the anhydrous material is effective because by means of it more water is removed before the impurities have had a chance to reach their final form and there is less removable water in the crystal than was previously the case. The present process employing, as it does, a higher temperature during the final stages of the reaction, results in a more completely reacted anhydrous product on which the coating forms, having more nearly its final composition and physical character. Further heat treating, which may be continued in the batch, or carried out as a separate step, perfects the character of the coating without any appreciable interference from the vaporization of water, such as water of reaction, through or from the coating. The removal of less water during the coating forming and heat treating periods may, therefore, be expected to render the coating less porous than was the case in the former process. The present products show generally less than 15.6% ignition loss before heat treatment, and less than 15.10 ignition loss after heat treatment.

In other words the formation of a crystal which is completely reacted so that water will not be generated during the heat treatment tends to produce a better crystal. This characteristic of the crystal is indicated by the total ignition loss before heat treatment. The crystals should have an ignition loss before heat treatment of not more than 15.6% and preferably not more than 15.5%. But the amount of available moisture is not the only characteristic which affects the qualities of the crystal. The place from which, and the manner in which, the moisture becomes available, as well as the actual amount liberated during heat treatment, all may affect the resulting material. The amount of moisture liberated is measured by the difference between the ignition loss before and after heat treatment. This difference also should be low.

In practice it has been found that with the present process the ignition loss differences are less than .65% and preferably less than .50%. The place and manner of water removal from the crystal is not directly measurable but is indicated by the reaction rates and stability of the product.

The ignition loss difference may be effected not only by the manner of preparation of the product, and particularly by the temperature during reaction, but also may be affected by adjustment of the impurities used.

The reduction in the available moisture during the completion of the reaction and prior to the heat treatment is particularly important in the regulation of the formation of pyrophosphate during the heat treatment, because pyrophosphate formation proceeds most rapidly in a humid atmosphere or in the presence of free acid. This behavior is quite well established, although it would normally be expected that dehydration to form pyrophosphate would be hindered by the presence of moisture.

In the present process a further improvement is made by utilizing from 3% to 25% of ground tailings from previous reaction mixtures. These tailings are crystals which were too large or which had agglomerated to form clusters. These are of necessity rejected because once the crystals are broken their value as a baking acid constituent is impaired. It has been found that the addition of the proper percentage of these tailings improves the process, the tailings apparently acting as seed for the formation of crystals of the proper size. However, if too small an amount of tailings is employed the crystals grow too fast and are improperly shaped. If too great a percentage of tailings is used, it interferes with the heat input to the reaction and it is not easy to maintain proper temperature gradients. However, it has been found that, in addition to the tailings, from 6% to 8% of unground rejected material may be included, this material having somewhat different effect than the tailings.

The following is a description of the preferred process and it is illustrated diagrammatically in the graph which comprises the drawing. As therein shown, the temperature is plotted against time.

The material employed in the example is as follows:

| | Pounds |
|---|---|
| Phosphoric acid containing 0.65% $K_2O$ and 0.56% $AlPO_4$. This material is introduced at a temperature of about 110° C. and a gravity strength of about 56.9° Bé. (corrected to 35° C.) | 2855 |
| Quick lime, ground so that 90% or more passes through a 200 mesh screen. The material should show a loss on ignition between 1.50% and 4.0% | 530 |
| Hydrated lime (equivalent to 190 lbs. of CaO) | 250 |
| Milled tailings from a previous operation, 90% passing through a 200 mesh screen | 300 |
| Reject material, unground. This material represents products which have been too much or too little heat treated or are rejected for any other cause which does not affect the purity of the material | 150 |

These materials are mixed in a pan mixer which provides thorough and rapid mixing of the material during all stages of the process. The mixer is covered by a hood with a stack which serves to remove steam liberated during part of the process. An adjustable damper in the stack is operated to control the humidity of the atmosphere above the material in the mixer.

The milled tailings and rejects are placed in the mixer. The acid is then run in from the heating tank and the mixture briefly agitated, and then allowed to stand for about 3 minutes. During this procedure the damper is closed to avoid cooling.

Agitation is then recommenced and the damper opened wide while quick lime is added at a constant rate regulated to produce a temperature of 140° C. in 4 minutes, and 150° C. in 10 minutes, from the time that the addition of lime is commenced, as shown on the graph. This rate of addition is continued until the temperature has reached point B on the graph (153° C.) in approximately 11 minutes. At this point the mixture thickens to such an extent that it will not splash. The rate of addition of lime is then reduced so that the point C on the graph (about 172° C.) is reached in another 4½ minutes, or total of about 15½ minutes from the beginning of the batch.

At this point C on the curve (172° C.) the addition of quick lime is stopped and the stack damper closed sufficiently to maintain an atmosphere substantially of steam in and above the material and prevent dilution with air from the room. The addition of hydrated lime is commenced at this point. This is added at such a rate as to produce a temperature of about 180° C. at the conclusion of the operation. While this will depend somewhat upon the previous history of the particular batch, it normally is produced by adding about 160 lbs. of hydrated lime in about 3 minutes. The remaining hydrated lime is added later as hereinafter described.

At the point D (180° C.) the damper is closed completely and the addition of hydrated lime stopped. During this stage the presence of a high humidity is important, and, in fact, if the temperature tends to rise too high, it may be controlled by spraying into the system small amounts of water. Preferably if the temperature tends to exceed 186° C., water is sprayed onto the batch to return the temperature to 186° C. An experienced operator will readily recognize in advance whether the batch is going to exceed 186° C. or not and, therefore, can spray in water in proper time to prevent overheating. It should be recognized, however, that the exact temperatures herein given are not critical and proper results have been obtained in which the temperature is permitted to go above 200° C. A satisfactory batch has been made with a peak temperature of 210° C. It is easier, however, to control all of the results at the temperatures here exactly described.

Approximately 5 minutes after the closing of the damper, at which time the temperature curve will have leveled off, the addition of the final 90 lbs. of hydrated lime is commenced, this being carried on at the rate of 10 lbs. per minute. The reaction during this stage is insufficient to maintain the high temperature, the temperature of the batch gradually falling to about 178° C. at the point G. This is due partially also to the fact that at the point F, some 2 minutes after the addition of hydrated lime is started, the damper is opened, although not all the way, to produce a cooling action on the batch and remove residual steam. This action causes some drying of the batch which is apparent to the eye, the crystals becoming visibly dusty.

After the last hydrated lime has been added, mixing of the batch is continued for about 3 minutes, after which the batch is subjected to heat treatment in accordance with the processes of United States Patent 2,160,232.

The complete batch had the following analysis prior to heat treatment:

| | |
|---|---|
| Neutralizing value | 87.6 |
| Free acid | 0.0 % |
| Loss | 15.50% |
| Pyrophosphate less than | 1.0 % |
| Total $P_2O_5$ | 58.40% |
| CaO | 25.19% |
| Fe and $AlPO_4$ | 0.65% |
| $FePO_4$ | 0.06% |
| $K_2O$ | 0.66% |
| $SO_3$ | 0.19% |
| Insoluble | 0.07% |
| Excess lime titration | 30.4 cc. |

(equivalent to 2.69% CaO in the finished batch in excess of the amount required to form monobasic salts)

The product may then be heat treated in the normal manner as described in Schlaeger Patent 2,160,232, preferably at a temperature of 200°–225° C., the temperature preferably being held above 210° C. for about 30 minutes.

The above material after heat treatment had an original secondary reaction of approximately 128 cc.

As has here before been stated, the control of the primary and secondary impurities is of considerable importance, particularly in connection with the present process. The preferred primary impurity is potassium, although ammonium, zinc and sodium also give highly satisfactory results. The preferred secondary impurity is aluminum. The ratio of impurities is preferably not less than 2 nor more than 4 atoms of primary impurity to 1 atom of secondary impurity for potassium to aluminum. Where ammonium is used with either tin or aluminum, the atomic ratio (considering $NH_3$ as an atom) should be at least 2 to 1 and may be considerably greater than that, a ratio of 15 to 1 having proved quite satisfactory. Where potassium and tin are employed, the atoms of potassium should be from 4 to 16 times the atoms of tin. Where zinc and aluminum are employed, the number of atoms of zinc should be at least twice the number of atoms of the aluminum.

When potassium is the primary impurity, it is preferred that the amount employed should not be over 1.5% (calculated as $K_2O$), since greater amounts do not improve and may harm the product. Amounts above 1% of $K_2O$ tend to promote formation of pyrophosphate.

In the present process the aging of the tailings in hot acid for a few minutes is not always an essential step but it is preferred to use it because with some tailings it reduces the probality of offgrade material and tends to reduce the amount of tailings. Inasmuch as it is impossible to tell from an examination of the milled tailings whether they require the treatment or not, it is preferred to employ the step as a standard one.

In connection with the curve shown in the drawing, the addition of the quick lime up to the point A which is shown as 138° C. but may vary several degrees, causes the temperature to rise with great rapidity because the liquid is below the boiling point and little steam is given off. At the point A the boiling point of the acid is reached, and the rise in temperature is slow because of the heat absorbed in evaporating water. From this point, any increase in temperature corresponds to the increase in concentration of the acid. From 140° to 150° C. there is a very rapid evolution of steam.

At approximately the point B (150° C.), the physical consistency of the slurry becomes less liquid, there being too little liquid left to splash. From this point on, the lime is added slowly so that it will have time to mix and react. If the lime is added too rapidly, the proper peak temperature will be reached while the reacting mass still contains too high a concentration of free acid, thereby facilitating the formation of undesirable amounts of pyrophosphate. The physical consistency of the mass after the point B may be referred to as less than semi-fluid.

The point C at which the addition of quick lime is stopped may be varied several degrees from the temperature (172° C.) shown on the curve. The exact point is adjusted in each case, depending upon the reactivity of the quick lime, the rate at which it has been added since the point B and other factors of heat content, radiation, etc., which depend upon local conditions. Those skilled in the art, however, will have no difficulty in regulating this control in light of the description already given. The regulation should be such that the proper temperature is reached when approximately three-fourths of the amount of lime theoretically required has been added as quick lime.

From point C to D sufficient hydrated lime is added theoretically to neutralize the remaining free acid to monobasic salts. During this period, as the temperature rises the free acid present rapidly diminishes. The evolution of steam, however, continues at a diminishing rate past the point G.

Between points D and F the reaction mass loses its moist, clingy appearance and changes to a dry powder.

From point E to G approximately 90 lbs. of hydrated lime in excess of that theoretically required is slowly added to neutralize all traces of unreacted free acid.

The total amount of lime added is always sufficient to produce a neutralizing value below 95 but not below 80, and preferably the neutralizing value is between 84 and 90.

As an example of the difference in stability of the present product and that produced by the previous process, a product containing 1.04% $K_2O$ and aluminum atoms one-half the number of the potassium atoms was compared with a product produced at the former batch temperature of 160° to 170° C. Both products were heat treated at a temperature of 200° to 220° C. The high temperature batch material showed an original secondary reaction (2 to 10 minute difference) 116 cc. At the end of 10 days in a humidor at 39° C. in an atmosphere of 67% relative humidity, the secondary reaction was still 111 cc. At the end of 20 days it was 102 cc., and at the end of 40 days it was 100 cc.

A material with the same impurity content produced by the low temperature batch had an initial secondary reaction of 117 cc. which, under the same storage conditions, had reduced to 97 cc. at the end of 10 days, and 84 cc. at the end of 20 days. At the end of 40 days this material had a secondary reaction of only 42 cc.

On the other hand, using the same conditions, in lowering the atomic ratio of aluminum to one-third of the potassium, the products produced gave the following results, the storage conditions being also the same:

|  | Original | 10 days | 20 days | 40 days |
|---|---|---|---|---|
|  | cc. | cc. | cc. | cc. |
| High temp. batch | 127 | 120 | 121 | 117 |
| Low temp. batch | 128 | 115 | 110 | 90 |

The following table gives typical reaction rates as well as stability figures on a number of combinations:

Column E in its three parts represents the same figures for the product after 10 days' storage under the same conditions. Column F in its three parts gives the same figures after 20 days' storage under the same conditions.

It is of course possible to combine more than two impurities. That is, one or more impurities may be selected from the primary group or one or more impurities may be selected from the secondary group. For example, a high temperature batch was prepared containing 0.6% $K_2O$, 0.058% Al, and 0.25% Sn, which gives a ratio of 6 atoms of potassium to 1 each of aluminum and tin. This product, after heat treatment, had a 2-minute reaction of 44 cc., a 4-minute reaction of 90 cc., and a secondary reaction of 106 cc., even after 30 days' storage at 39° C., and 67% relative humidity.

Another product containing 0.6% $K_2O$, 0.25% Sn, and zinc sufficient to give a ratio of 6 atoms of potassium to 1 each of zinc and tin, after heat treatment and storage for 30 days at 39° C. and 67% relative humidity, had a 2-minute reaction of 39 cc., a 4-minute reaction of 85 cc., and a secondary reaction of 110 cc.

| No. | Impurities in heat treated product | | Baking powder reactions, c. c. | | | | | | | | | | |
|---|---|---|---|---|---|---|---|---|---|---|---|---|---|
|  | A Percent and type | B Atomic Ratio | Original C | | | After humidor Stg. at 39° C., 67% R. H. | | | | | | | |
|  |  |  |  |  |  | 5 days, D | | | 10 days, E | | | 20 days, F | | |
|  |  |  | 2 minutes | 4 minutes | 2–10 minutes | 2 minutes | 4 minutes | 2–10 minutes | 2 minutes | 4 minutes | 2–10 minutes | 2 minutes | 4 minutes | 2–10 minutes |
| 1 | 0.64% $K_2O$ | 0.64 | 15 | 59 | 126 | 23 | 66 | 112 | 28 | 67 | 105 | 60 | 104 | 80 |
| 2 | 0.217% $NH_3$ | 0.60 | 20 | 43 | 121 | 24 | 46 | 116 | 32 | 57 | 102 | 54 | 90 | 80 |
| 3 | 1.39% Zn | 1.00 | 18 | 63 | 129 | 115 | 146 | 44 | | | | | | |
| 4 | 0.513% Al | 0.90 | 114 | 144 | 42 | 95 | 134 | 52 | 118 | 146 | 34 | | | |
| 5 | 0.64% $K_2O$ / 0.128% Al | 2.88 K:1 Al | 17 | 60 | 125 | 21 | 56 | 117 | 31 | 71 | 113 | 41 | 86 | 101 |
| 6 | 0.64% $K_2O$ / 0.10% Sn | 16.0 K:1 Sn | 17 | 41 | 122 | 19 | 40 | 117 | 24 | 50 | 110 | 32 | 50 | 98 |
| 7 | 0.64% $K_2O$ / 0.10% Cd | 15.0 K:1 Cd | | | 128 | | | 117 | | | 108 | | | 87 |
| 8 | 0.217% $NH_3$ / 0.128% Al | 2.7 $NH_3$:1 Al | 23 | 60 | 115 | 42 | 92 | 104 | 46 | 98 | 99 | 51 | 100 | 96 |
| 9 | 0.217% $NH_3$ / 0.10% Sn | 15.0 $NH_3$:1 Sn | 14 | 40 | 134 | 20 | 52 | 124 | 22 | 49 | 122 | 27 | 56 | 110 |
| 10 | 1.39% Zn / 0.205% Al | 2.81 Zn:1 Al | 13 | 38 | 128 | 13 | 41 | 123 | 19 | 43 | 127 | 26 | 50 | 114 |
| 11 | 1.39% Zn / 0.42% Sn | 6.0 Zn:1 Sn | 54 | 100 | 94 | 53 | 105 | 91 | 63 | 115 | 90 | 68 | 120 | 86 |
| 12 | 1.39% Zn / 0.398% Cd | 6.0 Zn:1 Cd | 15 | 53 | 126 | 45 | 92 | 100 | 50 | 108 | 94 | 60 | 110 | 92 |
| 13 | None | | 90 | 130 | 66 | | | | | | | 100 | 140 | 56 |
| 14 | 0.475% $Na_2O$ | 0.72 | 19 | 55 | 127 | | | | 50 | 103 | 91 | 74 | 115 | 71 |
| 15 | 0.0885% Li | 0.60 | 34 | 102 | 116 | | | | 108 | 138 | 42 | | | |
| 16 | 0.0885% Li / 0.128% Al | 2.7 Li:1 Al | 21 | 85 | 123 | | | | 87 | 130 | 63 | | | |
| 17 | 0.0885% Li / 0.150% Sn | 10.0 Li:1 Sn | 30 | 100 | 116 | | | | 75 | 123 | 79 | | | |
| 18 | 0.217% $NH_3$ / 0.79% Boric Acid | 1.0 $NH_3$:1 B | 20 | 38 | 120 | | | | | | | 44 | 88 | 94 |
| 19 | 0.217% $NH_3$ / 0.119% Fe | 6.0 $NH_3$:1 Fe | 15 | 57 | 138 | | | | 29 | 78 | 120 | 50 | 96 | 96 |

Column A shows the percentage of each impurity contained in the heat treated anhydrous monocalcium phosphate. Column B gives the atomic ratio of primary to secondary impurity, except in items 1, 2, 3, 4, 13, 14 and 15 in which the figures represent the percentage of $K_2O$ which would be present if equal atomic proportions of K were substituted for the stated impurities. Column C is divided into three parts, of which the first column represents the primary (0 to 2 minutes) reaction of the product as originally made. The second column of C is the 0 to 4 minute reaction, and the third column of C is the 2 to 10 minute difference or the secondary reaction. Column D represents in its three parts the same figures for the product after 5 days' storage in a humidor at 39° C. and 67% relative humidity.

The ratio of secondary impurity which should be added, as compared with primary impurity, decreases as the amount of secondary impurity increases. That is, the secondary impurities seem to become more effective on a ratio basis, as their concentration increases. It has been found, however, that no improvement is achieved by using more than an equivalent atomic proportion of the secondary impurity. The atomic ratio of primary and secondary impurities is preferably greater than 2 to 1. If potassium is the primary impurity and aluminum is the secondary impurity, the ratio should be between 2 to 1 and 4 to 1. The amount of $K_2O$ should not be above 1.5% and preferably should be below 1%. Larger amounts tend to promote the formation of pyrophosphate.

The following table shows additional figures on some other examples of the control of impurities.

| No. | Impurities in Heat Treated Product | | Baking Powder Reactions, cc. | | | | | | | | | | |
|---|---|---|---|---|---|---|---|---|---|---|---|---|---|
| | | | Original | | | After humidor Stg. at 39° C., 67% R. H. | | | | | | | |
| | | | | | | 10 days | | | 20 days | | | 30 days | | |
| | Percent and Type | Atomic Ratio | 2 minutes | 4 minutes | 2-10 minutes | 2 minutes | 4 minutes | 2-10 minutes | 2 minutes | 4 minutes | 2-10 minutes | 2 minutes | 4 minutes | 2-10 minutes |
| 1 | 0.64% K₂O / 0.10% Sn | 16.0 K:1 Sn | 17 | 41 | 122 | 24 | 50 | 110 | 32 | 50 | 98 | 55 | 97 | 90 |
| 2 | 0.64% K₂O / 0.15% Sn | 10.7 K:1 Sn | 16 | 41 | 124 | 21 | 54 | 122 | 40 | 80 | 104 | 78 | 120 | 70 |
| 3 | 0.64% K₂O / 0.20% Sn | 8.0 K:1 Sn | 16 | 37 | 128 | 24 | 57 | 121 | 48 | 90 | 98 | 93 | 129 | 60 |
| 4 | 0.217% NH₃ / 0.10% Sn | 15.0 NH₃:1 Sn | 14 | 40 | 134 | 22 | 49 | 122 | 27 | 56 | 110 | 67 | 106 | 76 |
| 5 | 0.217% NH₃ / 0.189% Sn | 8.0 NH₃:1 Sn | 23 | 87 | 125 | 53 | 115 | 101 | 52 | 111 | 100 | 57 | 111 | 92 |
| 6 | 0.217% NH₃ / 0.715% Cd | 2.0 NH₃:1 Cd | 18 | 47 | 121 | 47 | 85 | 94 | 107 | 138 | 45 | | | |
| 7 | 1.39% Zn / 0.398% Cd | 6.0 Zn:1 Cd | 15 | 53 | 126 | 50 | 108 | 94 | 60 | 110 | 92 | 83 | 123 | 70 |
| 8 | 1.39% Zn / 0.205% Al | 2.81 Zn:1 Al | 13 | 38 | 128 | 19 | 43 | 127 | 26 | 50 | 114 | 29 | 61 | 116 |
| 9 | 0.64% K₂O / 0.071% Al / 0.25% Sn | 6.4 K:1.2 Al:1 Sn | 16 | 53 | 125 | 30 | 80 | 116 | 36 | 79 | 112 | 44 | 90 | 106 |
| 10 | 0.64% K₂O / 0.139% Zn / 0.25% Sn | 6.4 K:1 Zn:1 Sn | 18 | 52 | 131 | 38 | 93 | 105 | 37 | 79 | 108 | 39 | 85 | 110 |
| 11 | 0.64% K₂O / 0.128% Al / 0.278% Zn | 6.4 K:2.2 Al:2 Zn | 12 | 47 | 121 | 21 | 51 | 110 | 37 | 75 | 103 | 45 | 88 | 88 |

The products produced by careful control of the ratio of impurities not only retain secondary reactions over a longer period but hydrate more slowly.

The following table shows the rate of hydration of a number of such products.

| Impurities | Atomic Ratio | Percentage Hydration | | | | | | | | | |
|---|---|---|---|---|---|---|---|---|---|---|---|
| | | 1 Day | 2 Days | 3 Days | 4 Days | 5 Days | 6 Days | 7 Days | 8 Days | 9 Days | 10 Days |
| 0.65% K₂O / 0.124% Al | 3 K:1 Al | 2 | 3 | 5 | 6 | 7 | | 9 | | | |
| 0.217% NH₃ | | 16 | 11 | 13 | 18 | 25 | 32 | 55 | | | |
| 0.217% NH₃ / 0.10% Sn | 15 NH₃:1 Sn | 13 | 9 | 11 | 10 | 13 | 18 | 23 | | | |
| 1.39% Zn | | 14 | | 19 | 25 | 35 | 43 | 49 | | | 61 |
| 1.39% Zn / 0.192% Al | 2.81 Zn:1 Al | 3 | | 4 | 6 | 6 | 8 | 9 | | | 11 |
| 0.64% K₂O / 0.071% Al / 0.25% Sn | 6.4 K:1.2 Al:1.0 Sn | 1 | 2 | 7 | 5 | | | | 6 | | 10 |

The impurities should be added in a form in which they are available for the desired purposes. Ordinarily, salts or compounds are selected which are readily soluble in phosphoric acid of the concentration employed, and which will not introduce any undesirable additional impurity into the compositions. For example, oxides, hydrates, hydroxides, phosphates or carbonates are generally utilized.

The preferred percentage range of primary impurities is as follows:

| | Per cent |
|---|---|
| K | .350 to 1.000 |
| Na | .206 to .590 |
| NH₃ | .154 to .437 |
| Li | .063 to .180 |
| Zn | .580 to 1.660 |

This application is a continuation-in-part of our co-pending applications Serial No. 376,246, filed January 27, 1941, now abandoned, and Serial No. 376,247, filed January 27, 1941, now forfeited.

The foregoing detailed description has been given for clearness of understanding only, and no unnecessary limitations should be understood therefrom.

What we claim as new, and desire to secure by Letters Patent, is:

1. The method of forming crystalline anhydrous monocalcium phosphate substantially free from pyrophosphate which comprises reacting hot highly concentrated orthophosphoric acid with lime, the lime being added in the form of quick lime at such a rate as rapidly to produce a temperature of approximately 153° C. and until the mixture is less than semi-fluid, then adding quick lime at a reduced rate sufficient to produce a temperature of about 172° C. before a neutralizing quantity of lime has been added, then completing neutralization with hydrated lime at such a rate as to produce a peak temperature in excess of 180° C., and then adding an additional quantity of hydrated lime at a slower rate, the total lime being sufficient to produce a neutralizing value less than 95 and above 80, and introducing into the above mass a selected primary and secondary impurity, the primary impurity being selected from the group consisting of sodium, potassium, lithium, ammonium, and zinc, and the secondary impurity being selected from the group consisting of aluminum, tin, iron, cadmium and boron in controlled ratio, the ratio being at least one atom of primary impurity for each atom of secondary impurity, the amount of a secondary impurity being at least approximately $\frac{1}{10}$% by weight of the phosphate, the amount of primary impurity being equivalent to potassium .350% to 1.000%, sodium .206% to .590%, ammonium .154% to .437%, lithium .063% to .180%, and zinc .580% to 1.660%.

2. The method as set forth in claim 1, in which the amount of lime added is sufficient to produce a neutralizing value between 84 and 90.

3. The method as set forth in claim 1, in which the peak temperature is approximately from 185° to 210° C.

4. Anhydrous crystalline monocalcium phosphate having a thin, glassy, autogenous, substantially complete, relatively insoluble coating thereon, said product including 0.35 to 1.000% potassium as a primary impurity and including at least $\frac{1}{10}$ of 1% of one secondary impurity selected from the group consisting of aluminum, tin, cadmium, iron and boron, the product being substantially free from pyrophosphate and containing at least one atom of potassium for each atom of secondary impurity, having a secondary reaction with sodium bicarbonate in excess of 50% and having a stability against hydration such that after 20 days' storage at 39° C. in an atmosphere of 67% relative humidity the secondary reaction is still at least 50%.

5. Anhydrous crystalline monocalcium phosphate having a thin, glassy, autogenous, substantially complete, relatively insoluble coating thereon, said product including from approximately 0.65% to 1.04% $K_2O$ and from 0.124% to 0.35% aluminum.

6. Anhydrous non-porous crystalline monocalcium phosphate having a thin, glassy, autogenous, substantially complete, relatively insoluble coating thereon, said product including a primary impurity selected from the group consisting of sodium, potassium, ammonium, lithium, and zinc, and a secondary impurity selected from the group consisting of aluminum, tin, cadmium, iron and boron, the product being substantially free from pyrophosphate and containing at least one atom of primary impurity for each atom of secondary impurity, containing at least $\frac{1}{10}$% by weight of the total phosphate product of one secondary impurity, having a secondary reaction with sodium bicarbonate in excess of 50% and having a stability against hydration such that after 20 days' storage at 39° C. in an atmosphere of 67% relative humidity the secondary reaction is still at least 50%, said primary impurity being equivalent to the following proportion:

| | Per cent |
|---|---|
| K | .350 to 1.000 |
| Na | .206 to .590 |
| $NH_3$ | .154 to .437 |
| Li | .063 to .180 |
| Zn | .580 to 1.660 |

WILLIAM HUGH KNOX, Jr.
ROBERT TAYLOR COCHRAN.
WILLIAM REMFRY CRUDUP.
WARREN STANDISH MILLER.

REFERENCES CITED

The following references are of record in the file of this patent:

UNITED STATES PATENTS

| Number | Name | Date |
|---|---|---|
| 1,943,919 | Knox | Jan. 16, 1934 |
| 2,160,232 | Schlaeger | May 30, 1939 |
| 2,160,700 | Knox | May 30, 1939 |
| 2,182,613 | Fiske | Dec. 5, 1939 |